United States Patent
Wilson et al.

[11] 4,153,268
[45] May 8, 1979

[54] CYCLE STABILIZING ACCESSORY

[76] Inventors: Thomas A. Wilson, 310 Thomas St., Roxana, Ill. 62084; Hallie W. Baxter, 605 Whittier, Wood River, Ill. 62095

[21] Appl. No.: 865,978

[22] Filed: Dec. 30, 1977

[51] Int. Cl.$^2$ .............................................. B62K 5/00
[52] U.S. Cl. .................................. 280/296; 280/299; 280/304
[58] Field of Search ................... 280/289 R, 239, 293, 280/295, 204, 296, 298, 299, 300, 304

[56] References Cited
U.S. PATENT DOCUMENTS

| | | | |
|---|---|---|---|
| 1,251,866 | 1/1918 | Cordaro | 280/204 |
| 2,468,894 | 5/1949 | Peek | 280/204 |
| 3,284,096 | 11/1966 | Hansen et al. | 280/239 X |
| 3,653,679 | 4/1972 | Howard | 280/204 X |
| 3,961,810 | 6/1976 | Arico | 280/239 |

Primary Examiner—David M. Mitchell
Assistant Examiner—Michael Mar
Attorney, Agent, or Firm—Kalish & Gilster

[57] ABSTRACT

Apparatus for attachment as an accessory to a cycle such as a bicycle, for stabilizing the cycle upon rearward rotation thereof about the rear wheel when the front wheel is raised from the surface upon which the cycle is located. The apparatus comprises a pair of elongated members secured to the structure of the cycle and extending generally rearwardly from the cycle and a brace extending rearwardly from the cycle to remote portions of the elongated members. A wheel arrangement is carried at remote ends of the elongated members for rolling engagement with the surface at a point rearward of the cycle upon rearward rotation thereof about the rear wheel axis through a predetermined angular extent.

10 Claims, 11 Drawing Figures

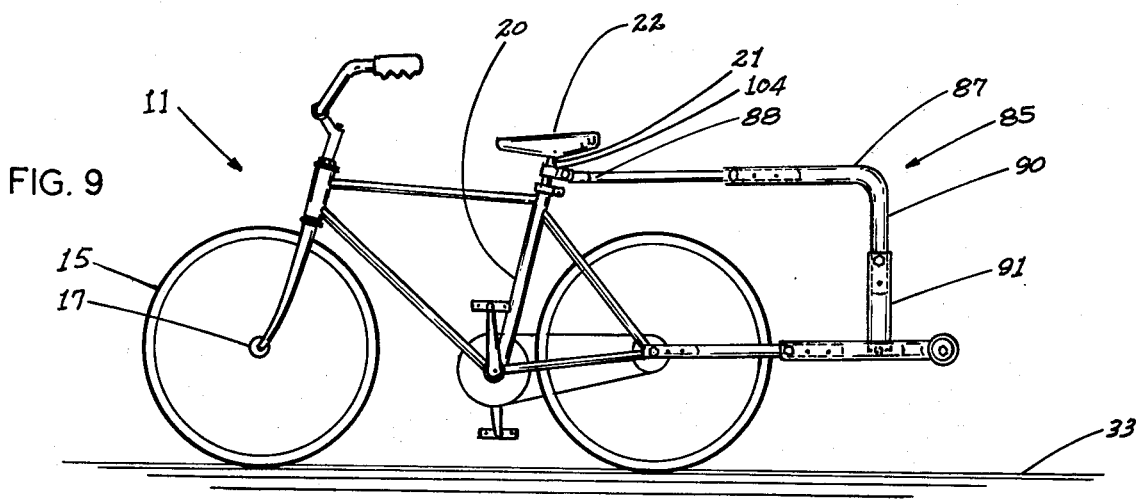
FIG. 9
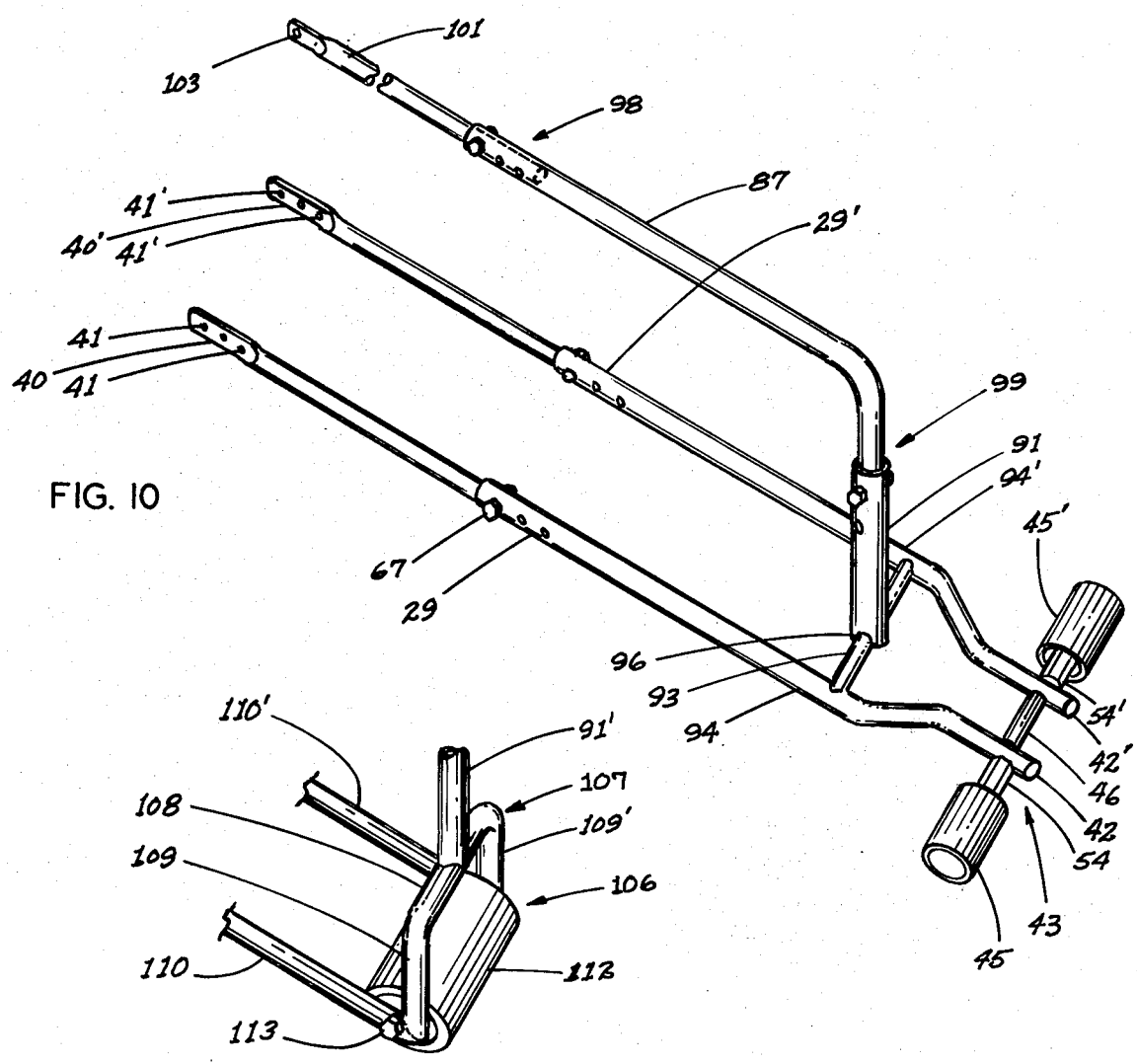
FIG. 10
FIG. 11

CYCLE STABILIZING ACCESSORY

BACKGROUND OF THE INVENTION

This invention relates to cycle accessories and, more particularly, to an accessory for attachment to a cycle such as a bicycle for stabilizing the same upon rearward rotation of such cycle about its rear wheel axis when the front wheel is raised.

In recent years, there has been a great increase in the popularity of motorcycles and particularly in the use of motorcycles for racing, hill climbs, cross-country events, and particularly stunts, such as jumping over obstacles and carrying out wheel stand maneuvers ofter referred to as "wheelies" during which the front wheel is raised off the surface and the cycle is rotated about its rear axis.

As a consequence, many youthful riders now seek to emulate such stunt maneuvers. In addition, bicycles and tricycles designed to resemble motorcycles in some aspects are now on the market which are balanced such that the rider can easily lift the front wheel off the ground during riding of same so as to carry out a so-called "wheelie". A problem often encountered when youthful riders attempt to carry out such a maneuver is that they cause the bicycle or tricycle to fall over backward or to topple sideways as a result of their inexperience and lack of riding ability. Accordingly, it is most desirable to provide an accessory for stabilizing a bicycle to prevent such over rotation or falling over sideways and thus to increase the safety and stability of the rider in carrying out such maneuvers.

The provision of a device for providing such stabilization of a cycle, whether it be a motorcycle, bicycle, or tricycle will permit stunt riding such as wheel stands or socalled "wheelies" with a high degree of safety and stability and confidence on the part of the rider. Moreover, such a device can provide for training of riders in the performance of such stunts with a high degree of safety and confidence on the part of the rider which is conducive to the development of skill in riding.

However, the development of a device for commercial sale to be used as an accessory on bicycles or the like already in the hands of purchasers presents a problem in that various different bicycle, tricycle and other cycle configurations are now on the market which present difficulties in securing such an accessory to the structure of the cycle.

SUMMARY OF THE INVENTION

Among the several objects of the invention may be noted the provision of apparatus for attachment to a cycle for stabilizing the cycle upon rearward rotation thereof about the rear wheel axis; the provision of such apparatus which is intended as an accessory for a cycle and, more particularly, such an accessory which can easily be installed or removed from various types of cycles; the provision of such apparatus which permits wheel stands or so-called "wheelies" to be carried out by a rider with a high degree of safety and stability and conduces to the development of skill and confidence on the part of a rider of a cycle having such an apparatus; the provision of such apparatus which can be adapted for different sizes and configurations of bikes and can be removed from one bicycle and reinstalled on another bicycle by virtue of adjustable features; the provision of such apparatus which does not interfere with the normal use of the bicycle nor with the installation or presence of typical other bicycle accessories such as baskets or the like; the provision of such apparatus which is simple to install on the bicycle and simple to remove therefrom; the provision of such apparatus which not only precludes over-rotation of a cycle equipped with such apparatus when the cycle rotates rearwardly about its rear wheel axis by limiting such rotation to a predetermined angular extent, but also such apparatus which provides a degree of lateral stabilization of the bicycle when the bicycle is being ridden in a wheel stand or so-called "wheelie" maneuver; and the provision of such an apparatus providing for various degrees of lateral stabilization so that the amount of lateral stabilization needed corresponds to the skill of the rider; and the provision of such apparatus which is relatively simple and durable in construction and which is simply and economically manufactured.

BRIEF DESCRIPTION OF THE DRAWINGS

FIG. 9 is a side elevational view similar to FIG. 1 and showing a similar bicycle but illustrating an alternative embodiment of the apparatus secured thereto.

FIG. 10 is a pictorial view of the apparatus of FIG. 9 separate from the bicycle.

FIG. 11 is a pictorial view of an alternate wheel configuration, illustrating a wheel and associated remote portions of the apparatus, which may be used in place of the arrangement shown in FIG. 10.

Corresponding reference characters indicate corresponding parts throughout several views of the drawings.

DESCRIPTION OF THE PREFERRED EMBODIMENTS

Figure 1:
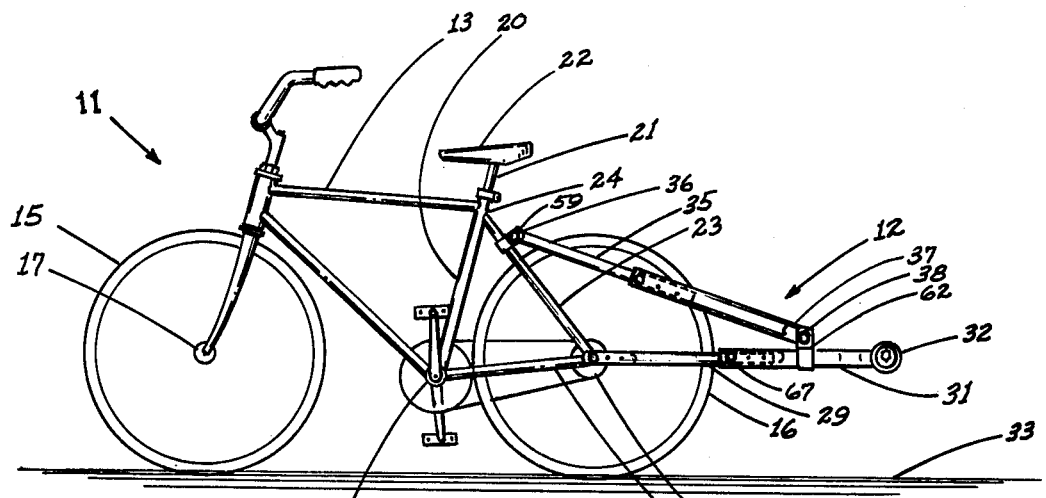
FIG. 1 is a side elevation of a bicycle equipped with one form of apparatus of the present invention.

Referring now to FIG. 1, a bicycle is indicated generally at 11, such bicycle being of a conventional configuration. Secured to bicycle 11 is an apparatus 12 of the present invention.

More specifically, the bicycle comprises the usual front wheel 15 and rear wheel 16 having respective front and rear axles 17 and 18. The frame includes a seat post tube 20, there being a seat post 21 extending upward therefrom for supporting a seat 22. On each side of rear axle 18, a pair of frame members such as shown at 23 extend from a point approximate rear axle 18 forwardly and upwardly toward a point 24 generally below seat 22. Another pair of frame members such as that illustrated at 26 extend forwardly on either side of axle 18 toward a pedal-and-crank assembly 27.

Apparatus 12 of the present invention which is secured to bicycle 13 comprises an elongated member 29 extending rearwardly from axle 18 and secured thereto at its forward end. Member 29 extends rearwardly from the bicycle and at a remote end 31 thereof carries a wheel 32. Wheel 32 is adapted to engage the surface 33 on which the bicycle is located when front wheel 15 is raised off surface 33 and the bicycle is rotated rearwardly about the axis of rear wheel axle 18 through a predetermined angular extent.

The apparatus also includes an elongated member 35 secured to frame member 23 by means of a pivot attachment 36 at the forward end of member 35. The opposite remote end 37 of member 35 is pivotally secured as indicated at 38 to member 29 at a point remote from the attachment of the latter member at axle 18 where bracing member 29 against vertical movement.

Figure 2:
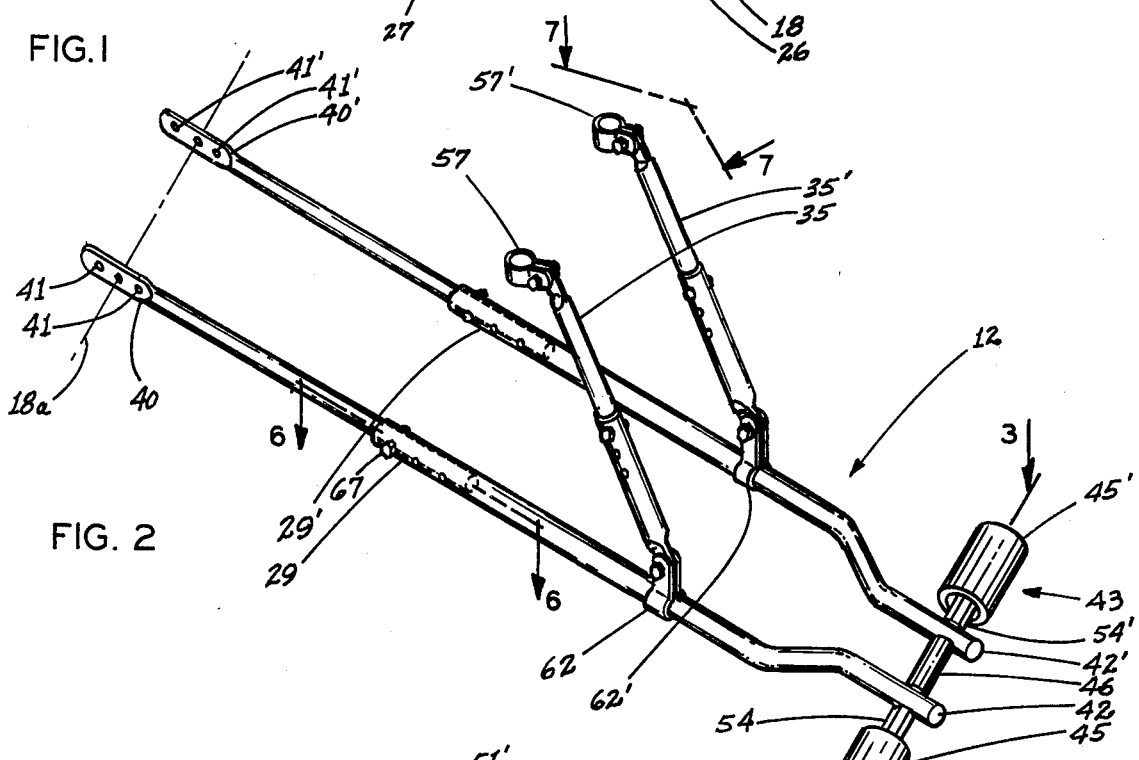
FIG. 2 is a pictorial view of the apparatus of FIG. 1 separate from a bicycle.

Referring to FIG. 2, embodiment 12 of the new apparatus is shown as having a pair of adjustable length members 29, 29' and a corresponding pair of brace members 35, 35'. As will be understood, members 29 and 35 pass on one side of wheel 16 and members 29', 35' on the other side of the wheel. Preferably, members 29, 29' and 35, 35' are of hollow tubular steel, aluminum or various alloys having suitable strength.

The forward ends of members 29, 29' are designated 40, 40', respectively. These ends have flattened portions as indicated preferably having a plurality of apertures such as designated at 41, 41' suitably dimensioned for receiving extensions of the rear axle 18. The axis 18a of the rear axle is shown passing through corresponding apertures in the corresponding member ends 40, 40'. At the opposite remote ends 42, 42' of members 29, 29' is secured a wheel and axle arrangement designated generally 43 and comprising a pair of wheels 45, 45' carried on extensions of an axle passing through a spacer 46 which spaces apart the member remote ends 42, 42'. Such axle is designated at 47 in FIG. 3 and is constituted by shaft which extends transversely outward from each of the remote ends 40, 40' of the elongated members 29, 29'. Such shaft or axle 47 carries a wheel 45, 45' on these respective outwardly extending oppositely disposed extensions thereof.

Specifically, wheels 45, 45' have respective roller bearing hubs through which respective studs 51, 51' pass, there being nuts 52, 52' threaded on such studs. Extensions of axle 47 are respectively designated 54, 54'.

Figure 3:
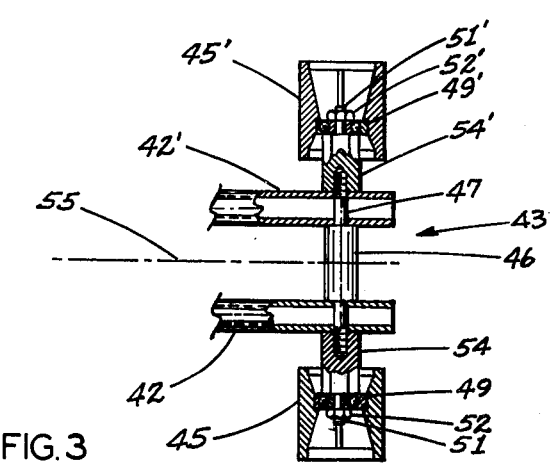
FIG. 3 is a cross sectional elevation taken along a line 3—3 of FIG. 2, illustrating a wheel assembly and associated remote portions of the apparatus of FIG. 2.
Figure 5:
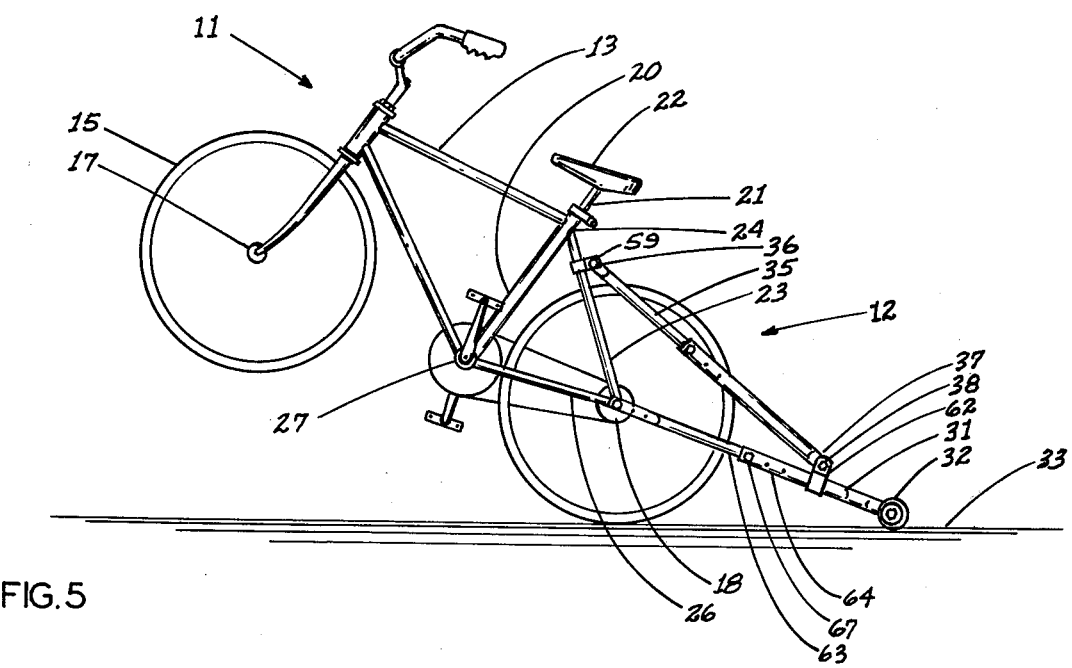
FIG. 5 is a side elevational view of the bicycle equipped with apparatus of the present invention and illustrating the bicycle in a position with the front wheel raised from a surface upon which the bicycle is located as occurring during a wheel-stand maneuver and illustrating engagement of such surface by a wheel of the new apparatus.

As will be understood, rear wheel 16 of the bicycle rotates in a plane which is designated by a line 55 in FIG. 3. Accordingly, with the wheel assembly 43 employed on the apparatus of the present invention, a bicycle when maneuvered into a wheel-stand position with its front wheel 15 off the surface 33 will be caused to rotate about the axis 18a of rear axle 18 until each wheel 45, 45' touches the surface, all as illustrated in FIG. 5. Accordingly, further rotation of the bicycle will be prevented so as to preclude the bicycle from being tipped over backward and throwing the rider to the ground. Moreover, because each wheel 45, 45' is disposed outwardly of the plane 55 of rotation of the rear wheel, a 3-point engagement with the ground is effected when a bicycle is in a position shown in FIG. 5. Thus, it will be apparent that the bicycle is also stabilized with respect to lateral movement thereof so that it is less likely to fall to either side, carrying the rider therewith to possible injury, particularly in the event that the rider is unskilled and unwary, as may be true in the case of a child learning to ride.

Figure 6:
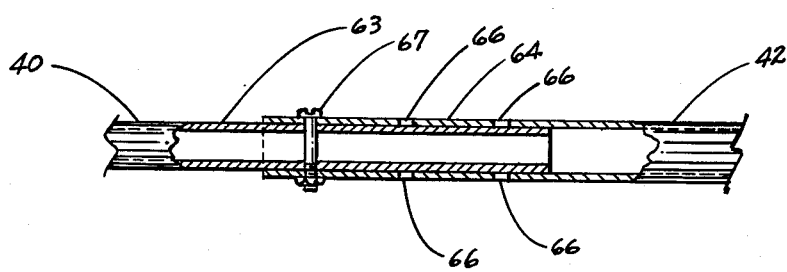
FIG. 6 is a cross sectional view, taken along line 6—6 of FIG. 2, and illustrating a telescoping relationship of elements of an adjustable length member of the apparatus.

Securement of embodiment 12 of the present invention to bicycle 13 is most readily accomplished. For this purpose, the forward ends of brace members 35, 35' are provided with respective straplike members 57, 57' which at least partly encircle respective frame members of the bicycle such as that shown at 23 in FIG. 1. In FIG. 6, the strap-like members designated 58 and as shown to partly encircle member 23. A proximal portion of brace member 35 is designated 60 and is flattened and provided with an aperture through which passes a nut and bolt assembly 59 or other suitable fastening means for securing strap-like member 58 to portion 60 of brace member 35. The opposite ends of each of brace members 35, 35' are similarly provided with strap-like members 62, 62' which partly encircle portions of members 29, 29', these similarly being secured to corresponding remote ends of base members 35, 35' in pivot relationship.

As noted previously, each of members 29, 29' and 35, 35' is of adjustable length. Each such member comprises a plurality of tubular elements in telescoping relationship.

As illustrated in FIG. 5, each adjustable length member comprises a plurality of tubular elements such as those designated at 63 and 64, element 63 being dimensioned for fitting in sliding telescoping relationship within element 64. Each of these portions of the adjustable length members is suitably drilled with a plurality of apertures such as those designated at 66 so as to receive a screw and nut assembly 67 for maintaining a fixed telescope configuration of elements 63 and 64 providing a predetermined length of the respective adjustable length member. Each of members 29, 29' and 35, 35' is provided with such an adjustment feature as will be revealed by FIG. 1.

Figure 4:
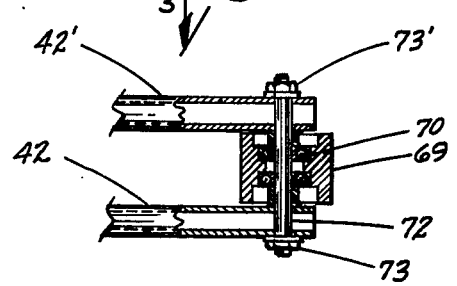
FIG. 4 is a cross sectional view similar to FIG. 3 but illustrating an alternative embodiment of a wheel assembly which may be utilized in place of that of FIG. 3.

Because of these adjustable length features, and the pivot relationship between fittings 57, 57' and 62, 62' at their associated ends of brace members 35, 35' the new accessory is quite well adapted for being installed on any of various sizes of bicycles and, conceivably also, on small motorcycles. Moreover, with little difficulty, the new accessory may also be used on tricycles, it being understood in such event that portions 40, 40' of the longitudinally extending members 29, 29' would be spaced apart sufficiently as to be secured to portions of the tricycle frame or rear axle thereof. As configured for use on a bicycle, however, members 29, 29' are spaced apart in approximately parallel relationship for a major portion of their lengths, such spacing being narrowed rearwardly at the point of attachment of members 62, 62' thereto. A reason for doing this is to provide a spacing between the remote ends 42, 42' for accommodating a single wheel 69 as illustrated in FIG. 4. Such wheel includes a suitable roller bearing hub 70 through which passes a transversely extending shaft or axle 72 secured in place by appropriate means such as nuts 73, 73'. When the single wheel arrangement of FIG. 4 is employed, it will be understood that the tripod stabilizing result of the two-wheel configuration of FIG. 2 and FIG. 3 is no longer provided. This may be desirable as a rider learns to balance the bicycle laterally and thus the apparatus, when so configured, precludes overrotation of the bicycle about the rear wheel axle 18 but leads the rider to develop a sense of lateral balance which thereby improves his skill in carrying out a wheel-stand maneuver on a bicycle equipped with the present apparatus.

Figure 7:
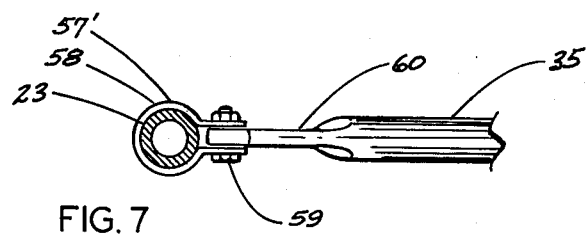
FIG. 7 is a view, partly in cross section, developed along line 7—7 of FIG. 1 and illustrating a portion of the bicycle frame and the securement of a member of the present apparatus thereto.
Figure 8:
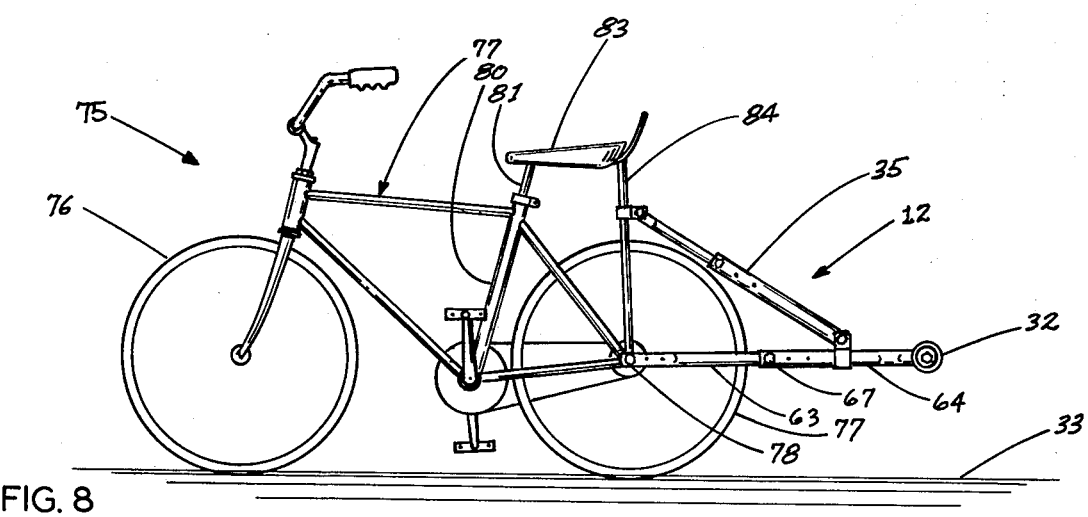
FIG. 8 is a side view of a bicycle like FIG. 1 but illustrating a bicycle of a different seat support configuration and showing the present apparatus secured thereto.

Referring now to FIG. 7, the embodiment previously described of the new apparatus is shown secured to a bicycle 75 of a different configuration. Again, the bicycle has a frame 77 and the usual front wheel 76 and rear wheel 77, the rear wheel being carried by the frame by means of a rear axle 78. The frame includes a seat post tube 80, there being a seat post 81 extending upwardly therefrom and supporting the front portion of an elongated seat 83 of the type frequently found on childrens' bicycles and often referred to as a "banana" seat because of its shape. Thus seat post 81 provides a first seat support means. A further seat support means is presented by an approximately vertically extending member 84, such member extending from a point which is proximate rear axle 78 to the rear of seat 83. Conventionally, such a rear seat support member 84 is of tubular configuration. Because of the length and pivot adjustment features of the accessory, brace member 35 is readily secured to seat support member 84 as illustrated.

When the new accessory is installed on a bicycle as configured in either of FIGS. 1 or 7, the location of the wheel arrangement 32 above surface 33 is a matter of choice dependent upon the desire of the parent or the user of the bicycle to limit angular rotation of the bicycle about the rear axle as illustrated in FIG. 5. In addition, the adjustment features for members 29, 29' as well as the adjustment features for the brace members 35, 35' permit the spacing between wheel 32 and rear axle 78 of the bicycle to be adjusted as desired. For purposes of illustration, this distance is exaggerated somewhat in the drawings, it being understood that wheel 32 may be positioned much closer to the rear wheel 16 and axle 18 than is illustrated.

FIG. 9 illustrates an alternative embodiment 85 of the invention. This embodiment includes adjustable length members 29, 29' as previously described, but in place of a single brace member 87, the latter being adjustable in length. Embodiment 85 is shown in FIG. 9 as being secured to a bicycle 11 of the configuration shown in FIG. 1. Brace member 87 is secured at one end 88 thereof to the seat post 21 of the bicycle and is configured in an L-shape so as to extend rearwardly from seat post 21 and above rear wheel 16 to an elbow portion 90 and there extends vertically downward where it is secured at a lower end 91 to a link 93 extending between remote portions 94, 94' of members 29, 29', such link being suitably welded or otherwise secured in place. A wheel and axle assembly 43 such as shown in FIG. 2 and FIG. 3 may be employed, or a single wheel configuration such as illustrated in FIG. 4 may instead be employed. The remote end 91 of brace member 87 is provided with an aperture 96 extending transversely therethrough for accommodating link 93 in pivot relationship.

Brace member 87 is provided with a first telescoping assembly 98 in the rearwardly extending portion thereof and a further telescoping assembly 99 in the vertically extending portion thereof, each such telescoping arrangement being like that illustrated in FIG. 6. The forward end or portion 101 of the brace is provided with an aperture 103 for being secured to a strap-like member 104 of the type illustrated in FIG. 7 so as to secure said portion 101 to seat post 21.

An alternative wheel assembly 106 suitable for embodiment 85 of the new accessory is illustrated in FIG. 11. As will be seen, the vertically extending portion of the brace member 87 is designated 91' and is integrally joined with a U-shaped member 107 having a transverse portion 108 and vertically extending portions 109, 109'. The latter portions are integrally joined with portions 110, 110' which corresponds to those portions 94, 94' of members 29, 29' illustrated in FIG. 10. Positioned between the remote portions 110, 110' is a wheel 112 which is suitably secured by an axle or bolt such as illustrated at 113. The arrangement of FIG. 11 provides not only simplicity of design but an arrangement of considerable strength and thus may be employed as a modification of the embodiment of FIG. 9 where a pivot relationship between the vertical member 91 of brace 87 and the horizontal member 29 is not necessary.

In view of the foregoing, it will be seen that the several objects of the invention are achieved and other advantages are attained.

The specific embodiments described as shown herein are intended to be illustrative, the scope of the invention being indicated by the following claims wherein all variations within the range of equivalence are intended to be encompassed.

What is claimed is:

1. For use with a bicycle having a front wheel and a rear wheel, a seat, and a frame carrying said wheels and supporting said seat, said bicycle being rearwardly rotatable about an axis extending through the rear wheel axle by raising the front wheel from the surface upon which the bicycle is located, stabilizing apparatus for securement to said bicycle for stabilizing the bicycle upon rearward rotation thereof, said apparatus comprising a pair of elongated members of tubular character extending rearwardly of said bicycle, each said elongated member having a forward portion secured to said rear wheel axle in fixed angular relationship with respect to said frame, said elongated members extending on opposite sides of said rear wheel and each including spaced apart rear axle-remote portions, a stabilizing wheel axle carried transversely between said axle-remote portions, at least one stabilizing wheel carried by said stabilizing wheel axle, each said elongated member being adapted to provide selective adjustment of distance between said rear wheel axle and stabilizing wheel axle, at least one brace means interengaging each of said elongated members and said frame for bracing therebetween, said brace means comprising a plurality of tubular elements in mutually telescoping relationship and means for maintaining a selectively fixed telescoped configuration of said tubular elements to provide selective adjustment of length of said brace means, one of said tubular elements including an aperture at one end thereof proximate a tubular structure of said bicycle, a strap-like element for at least partly encircling said tubular structure, and means extending through said aperture for securing said strap-like element and said tubular element in pivot relationship, said stabilizing wheel being adapted to engage said surface at a point rearward of said bicycle upon said rearward rotation thereof through a predetermined angular extent.

2. For use with a bicycle, stabilizing apparatus according to claim 1, said pair of elongated members extending in substantially parallel relationship on opposite sides of said rear wheel, said elongated members each including an offset portion, with such offset portions providing angling toward each other of said elongated members rearwardly of said rear wheel, said spaced apart rear axle-remote portions being rearward of said offset portions and being relatively closer together than other portions of said elongated members, said spaced apart rear axle-remote portions being substantially parallel.

3. For use with a bicycle, stabilizing apparatus according to claim 2, said stabilizing wheel axle extending through an aperture in each of said spaced apart rear axle-remote portions of said elongated members for maintaining such spaced apart relationship.

4. For use with a bicycle, stabilizing apparatus according to claim 3, said axle having threaded ends extending laterally outward from each of said spaced apart rear axle-remote portions, and means threaded thereon for securement of said axle.

5. For use with a bicycle, stabilizing apparatus according to claim 4, said rear axle-remote portions being spaced apart by an amount for receiving only said stabilizing wheel therebetween.

6. For use with a bicycle, stabilizing apparatus according to claim 4, a pair of axle extensions, each said threaded end of said stabilizing wheel axle being adapted for receiving one of said threaded axle extensions, each said extension carrying a said stabilizing wheel, thereby to provide stabilizing laterally outward on opposite sides of said bicycle.

7. For use with a bicycle, stabilizing apparatus according to claim 3, said forward portion of each said elongated member having a flattened end and comprising a plurality of laterally extending apertures spaced at intervals in said flattened end for selectively adjustable length securement thereof to said rear axle.

8. For use with a bicycle, stabilizing apparatus according to claim 7, each said elongated member comprising a plurality of tubular elements in mutually telescoping relationship and means for maintaining a selectively fixed telescoped configuration to provide further selective adjustment of the length of such elongated member.

9. For use with a bicycle, stabilizing apparatus according to claim 8, wherein another of the tubular elements of said brace means includes an aperture at one end thereof to provide such further aperture at the bicycle frame remote end of said brace means, a link rigidly interconnecting each of said elongated members at a point between the ends thereof, said link being of shaft-like form and extending through said further aperture for securement of said brace means to said elongated members in pivot relationship.

10. For use with a bicycle, stabilizing apparatus according to claim 9, said bicycle including a pair of members with one such member on each side of said rear wheel, said brace means comprising a pair of telescoping tubular structures, each secured at one end thereof to a corresponding one of said bicycle members at a position below said seat and secured at an opposite end thereof to a corresponding one of said elongated members.

* * * * *